US006240949B1

(12) United States Patent
Gerstenberger

(10) Patent No.: US 6,240,949 B1
(45) Date of Patent: Jun. 5, 2001

(54) THREE-WAY DIVERTER VALVE

(75) Inventor: Gerald Ross Gerstenberger, Bradenton, FL (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/488,003

(22) Filed: Jan. 20, 2000

(51) Int. Cl.[7] ...................................................... F16K 11/24

(52) U.S. Cl. .................... 137/109; 137/109; 137/119.03; 137/119.05; 137/565.33; 137/597; 417/286

(58) Field of Search ............................... 137/109, 119.01, 137/119.03, 119.04, 119.05, 565.33, 597; 417/286, 307

(56) References Cited

U.S. PATENT DOCUMENTS

| | | | | |
|---|---|---|---|---|
| 2,601,868 | * | 7/1952 | Gill | 137/119.01 X |
| 2,761,388 | * | 9/1956 | Peterson . | |
| 3,858,607 | | 1/1975 | Baker . | |
| 4,073,140 | * | 2/1978 | Lang et al. | 417/286 X |
| 4,169,491 | | 10/1979 | Bajka . | |
| 5,445,182 | * | 8/1995 | Sturman et al. | 137/119.03 |

* cited by examiner

*Primary Examiner*—Stephen M. Hepperle
(74) *Attorney, Agent, or Firm*—Millen, White, Zelano & Branigan, P.C.

(57) ABSTRACT

A three-way valve is configured as a solenoid operated diverter when the solenoid is used in parallel with a poppet valve. When the diverter is in a first mode, hydraulic fluid entering a first port exits the valve through a system outlet port while hydraulic fluid entering a second port exits through a second port. The solenoid valve is positioned to close the second port when energized in order to shift the system to a second mode. When the solenoid valve is energized to close the second port so that all of the fluid entering the second port opens the poppet valve and exits through the system outlet. By utilizing a poppet valve in parallel with a solenoid valve rather than a valve spool, the three-way diverter is able to operate at higher pressures and higher fluid flow because Bernoulli effects which cause closing of valve spools used in prior art three-way valves do not adversely affect the poppet valve.

6 Claims, 5 Drawing Sheets

THREE-WAY DIVERTER VALVE

FIELD OF THE INVENTION

The present invention is directed to a three-way diverter valve, and more particularly, the present invention is directed to a three-way diverter valve which utilizes a solenoid in combination with a poppet.

BACKGROUND OF THE INVENTION

Devices such as cranes, have lateral outriggers with hydraulically projected pads which engage the ground to keep the crane stable while in use. Since the hydraulically projected pads require pumped hydraulic fluid only when being projected, there is hydraulic pumping capacity available for other uses after the crane, or other device, has been stabilized.

In cranes, it is proposed to use a diverter valve for selecting two functions the flows of which are combined to achieve maximum operating efficiency of a single winching function. This requires a solenoid operated, three-way valve which in a satisfactory configuration is currently not available. Current three-way valves malfunction because they utilize a solenoid spool which is subject to Bernoulli forces.

In presently available three-way spool valves, malfunctions occur as certain flow limits are passed, during high pressure conditions, or when high flow rates combine with high pressure conditions. In order to cope with this phenomenon, attempts have been made to increase the size of three-way valves. However, as size increases, design difficulties are encountered because it is necessary to match available solenoid forces against a required spring force to overcome Bernoulli forces. Bernoulli forces occur when two negative flows caused by the velocity of hydraulic fluid over flow surface areas of the spool combine, creating a negative force which tends to close the valve spool. One approach to solving this problem has been to use solenoid-operated, four-way valves to perform the function of three-way valves. However, since four-way valves are of essentially the same design configuration as three-way valves, they also fail under Bernoulli forces. Another approach has been to use various combinations of bi-directional, two-way valves, but this requires two separate solenoid valves and it is preferable to utilize only a single solenoid valve. Use of two-way valves in combination is also not necessarily desirable because the two-way valves can sometimes stall or restrict flow if certain differential pressure conditions are not met.

SUMMARY OF THE INVENTION

The present invention is directed to a solenoid operated diverter valve comprising a valve body having a first inlet, a second inlet, a first outlet and a second outlet. A first passageway connects the first inlet and first outlet to the second inlet. A solenoid valve is disposed in a second passageway between the second inlet and the second outlet, the solenoid valve having a first mode in which hydraulic fluid flows through the solenoid valve to the second outlet and a second mode in which the solenoid valve blocks passage of fluid from the second inlet to the second outlet. A check valve is disposed between the first passageway and the second passageway. The check valve has a first end urged to close the first passageway to fluid from the second inlet and a second end connected to the second passageway for receiving pressurized hydraulic fluid from the second passageway to keep the check valve closed when the solenoid valve is in the first mode. The first end of the solenoid valve has fluid pressure from the first passageway applied thereagainst to open the second inlet to the first passageway when flow through the second passageway is blocked by the solenoid valve, wherein fluid from the second inlet flows into the first passageway and out of the first outlet rather than through the second outlet.

In a further aspect of the invention, the solenoid operated diverter valve includes a valve element which is closed when the solenoid valve is energized and is open when the solenoid valve is de-energized.

In a further aspect of the invention, the poppet of the solenoid operated diverter valve includes a spring arrangement for urging the poppet to close the first passageway to fluid from the second inlet.

In a further aspect of the invention, the poppet valve comprises a poppet element within a poppet housing and the spring arrangement comprises one spring urging the poppet housing to close the first passageway and another spring between the poppet housing and poppet element additionally urging the poppet element to close the first passageway.

In still a further aspect of the invention, the first inlet of the solenoid operated diverter valve is adapted to be connected to a first pump and the second inlet is adapted to be connected to a second pump.

In still a further aspect of the invention the solenoid diverter valve is used with a crane, the first pump providing system hydraulic pressure and the second pump providing pressure for a crane stabilizing system.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein.

DETAILED DESCRIPTION

Figure 1:
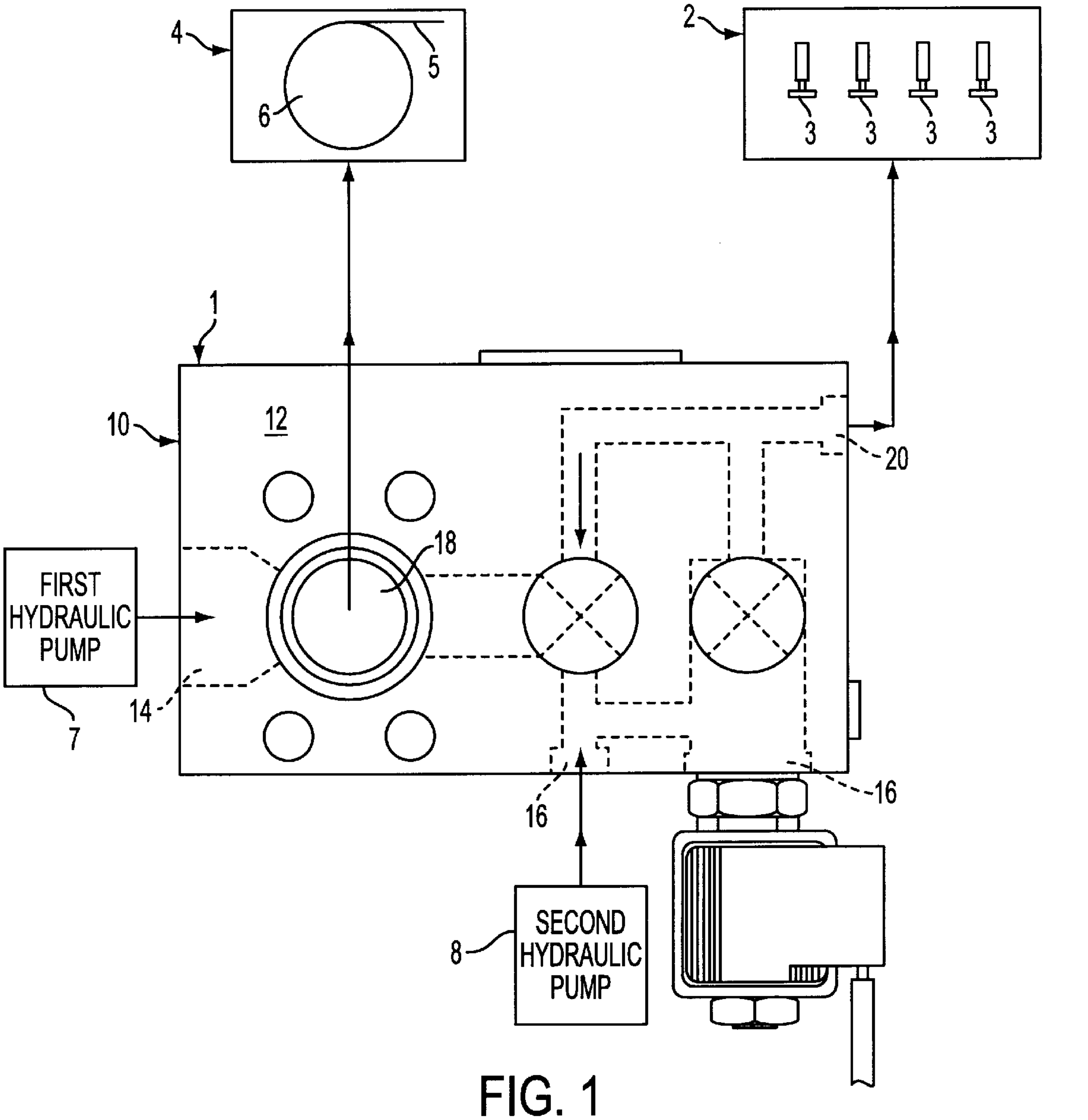
FIG. 1 is a side view, with portions shown in dotted lines, of a three-way valve configured in accordance with the principles of the present invention shown schematically connected to first and second pumps and to an outrigger system and a crane winching system.
Figure 2:
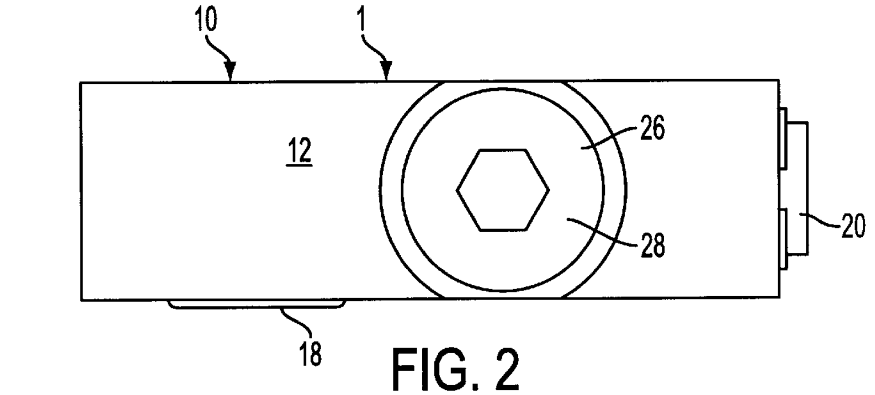
FIG. 2 is a top view of the three-way valve of FIG. 1.
Figure 3:
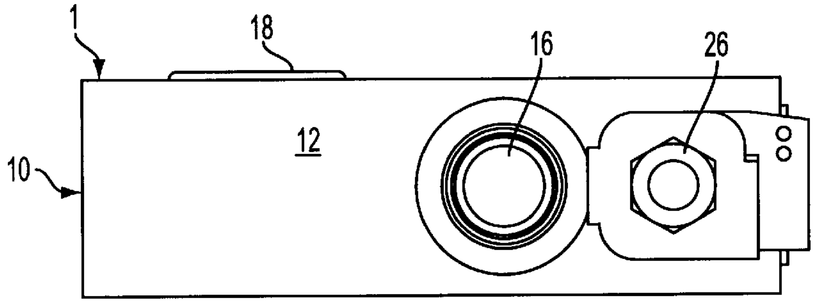
FIG. 3 is a bottom view of the three-way valve of FIGS. 1 and 2.
Figure 4:
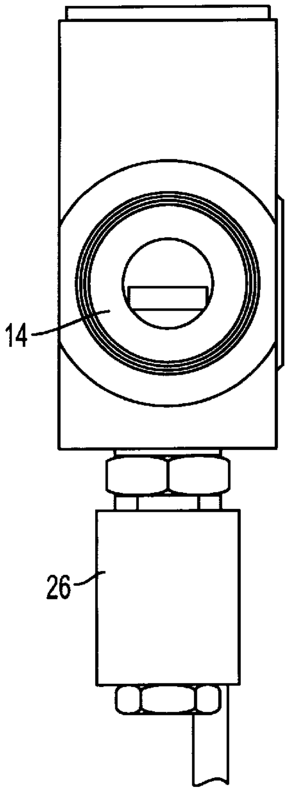
FIG. 4 is a view of a first end of the three-way valve of FIGS. 1–3.
Figure 5:
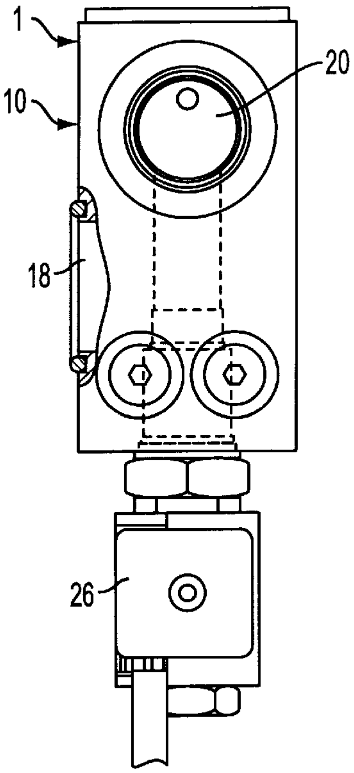
FIG. 5 is an end view of a second end of the valve shown in FIGS. 1–4 with portions broken away and with portions shown in dotted lines.

Referring now to FIG. 1, a three-way valve 1 is shown configured in accordance with the present invention. Exemplary of a use for the valve 1 is a crane (not shown) which has a stabilizing outrigger system 2 that utilizes ground engaging pads 3 which are hydraulically projected and includes a winching system 4 in which a cable 5 is wound on a drum 6. The winching system 4 is powered by a first pump 7 and the outrigger system 2 is powered by a second hydraulic pump 8. In accordance with the present invention, after the crane has been stabilized by engaging the ground with the pads 3 using hydraulic fluid pumped by the second hydraulic pump 8, the valve 1 redirects the hydraulic fluid from the second hydraulic pump to combine with that of the first hydraulic pump 7 to drive the drum 6 for winding the cable 5 during the winching function occurring in the winching system 4.

Referring now to FIGS. 1–5, the three-way valve 1 is configured as a solenoid operated diverter 10. The solenoid operated diverter 10 replaces standard three-way valves which utilize a spool. By not utilizing a spool, a three-way diverter 10 eliminates the problem of Bernoulli forces acting on a spool thus creating a negative force tending to cause the spool to close the valve.

Figure 6:
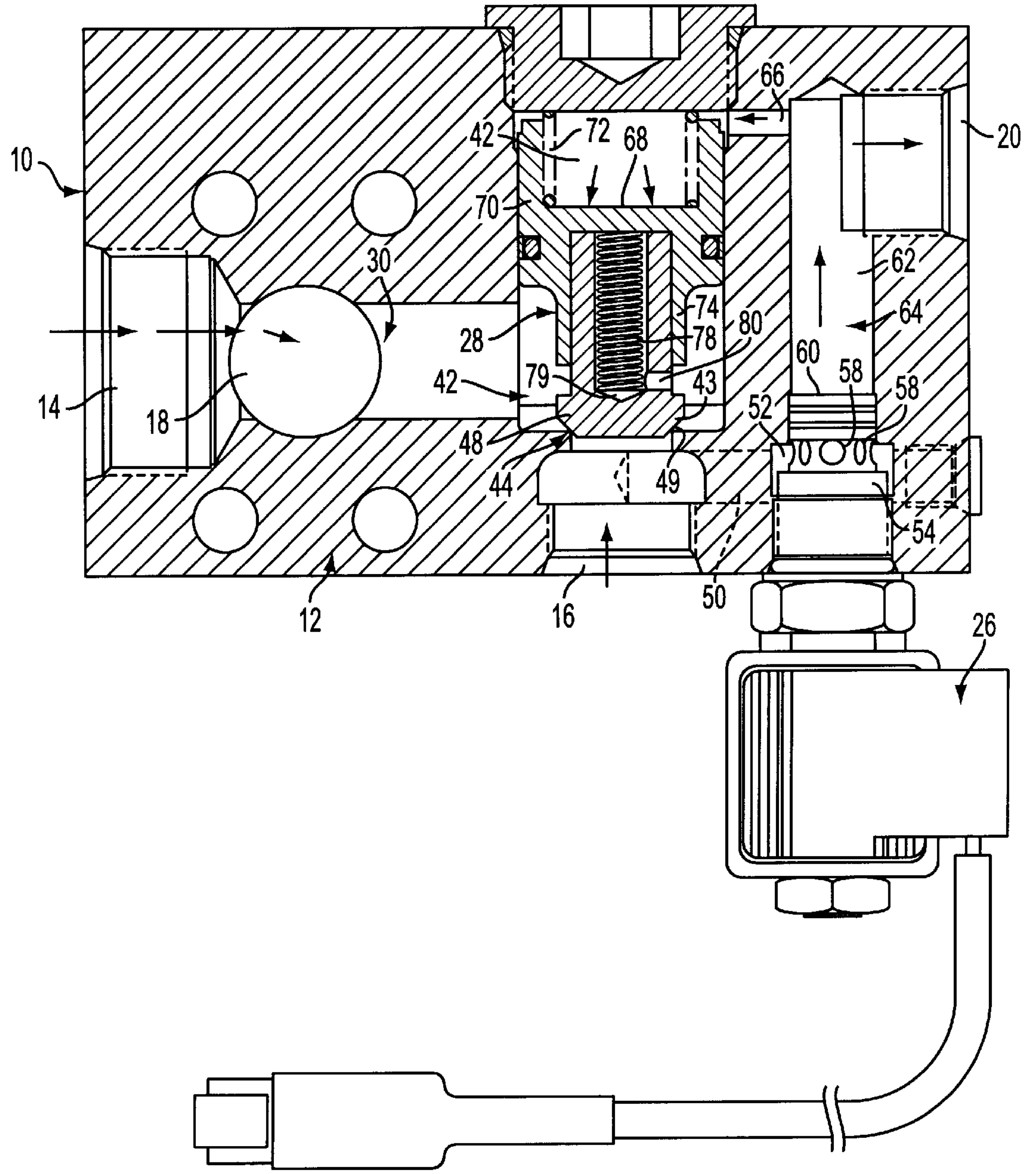
FIG. 6 is a side elevation taken along lines 6—6 of FIG. 2 showing the three-way valve operating in a first mode.
Figure 7:
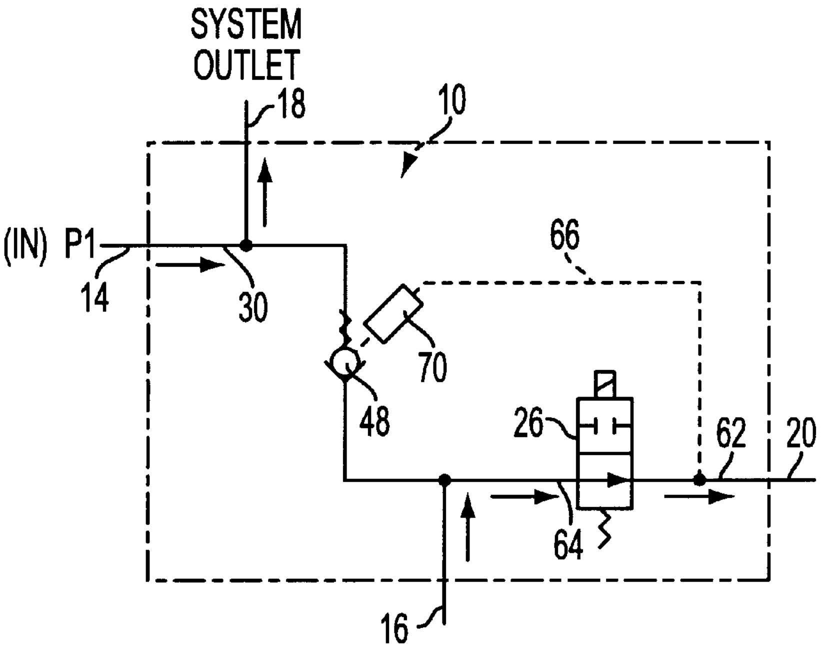
FIG. 7 is a hydraulic circuit diagram schematically illustrating flow through of the three-way valve when in the first mode.

The solenoid operated diverter 10 includes a valve body 12 having a first inlet port 14 (FIG. 4) connected to the first hydraulic pump 7. In accordance with the present invention, hydraulic fluid flowing into the first inlet port 14 exits through a first outlet port 18 which is a system outlet port, while hydraulic fluid flowing into a second inlet port 16 (FIG. 3) selectively exits through a second outlet port 20 (see FIGS. 2 and 5) when the solenoid operated diverter 10 is functioning in a first mode (FIGS. 6 and 7). When the solenoid operated diverter 10 is functioning in a second mode (FIGS. 8 and 9), substantially all of the hydraulic fluid flows through the system outlet port 18.

Referring now mainly to FIGS. 6–9, the selection between the first mode and second mode is determined by a two-way solenoid valve 26. The two-way solenoid valve 26 is disposed in parallel with a poppet valve 28. When the solenoid valve 26 is de-energized, all of the hydraulic fluid flowing into the second inlet port 16 from the second hydraulic pump 8 exits through the second outlet port 20 and when the solenoid valve 26 is energized, access to the second outlet port 20 is closed and hydraulic fluid entering the second inlet port 16 opens the poppet valve 28 and exits through the outlet port 18. When all of the fluid is exiting through the system outlet port 18, more pressurized fluid is available for the winching function so that the speed at which the winch winds cable can be substantially increased thus increasing the hoisting capability of the crane.

Figure 8:
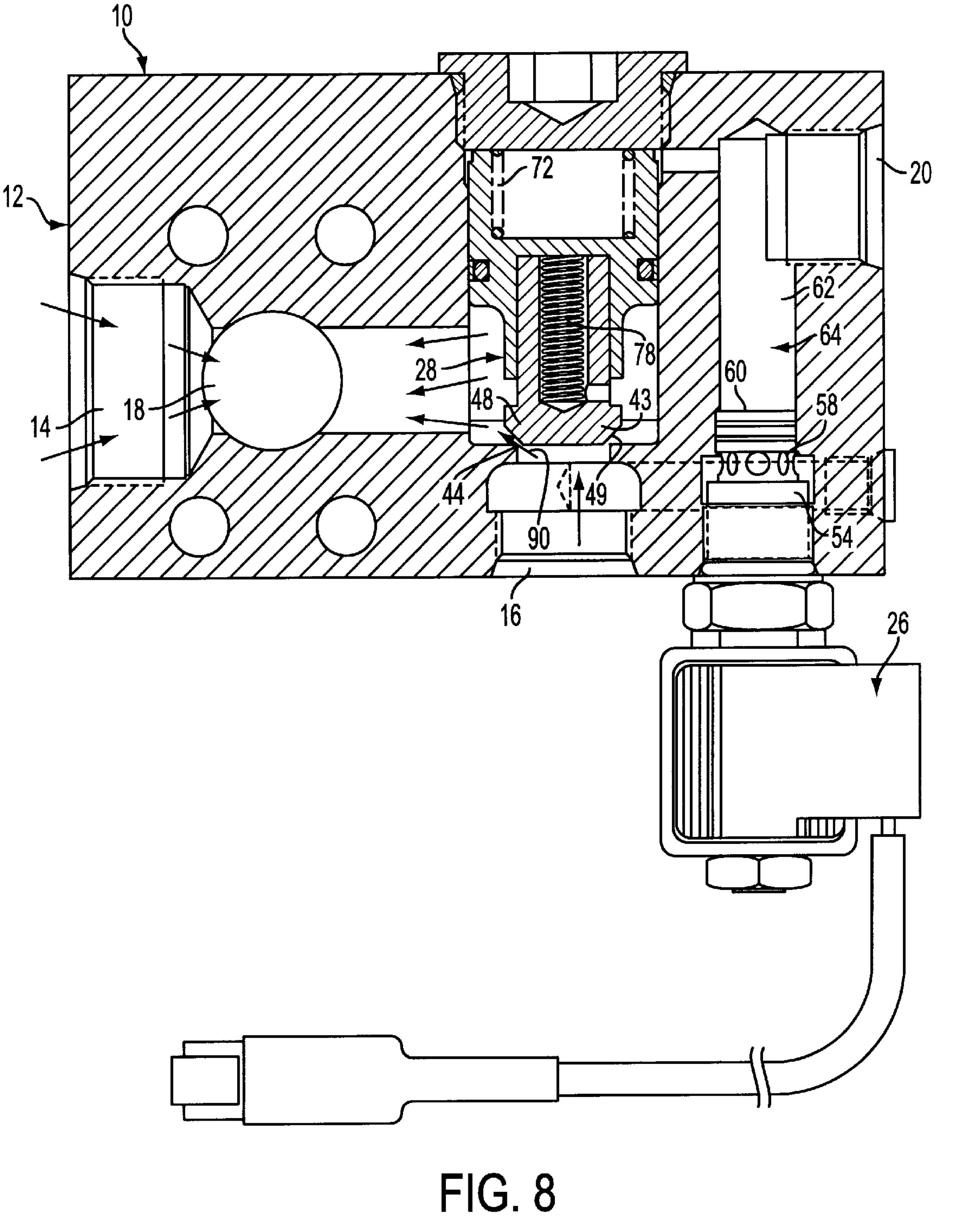
FIG. 8 is a side elevation similar to FIG. 6 but showing the three-way valve operating in a second mode.

As is seen in FIGS. 6 and 8, the valve body 12 has a first passageway 30 which connects the first inlet port 14 to both the system outlet 18 and to a chamber 42 which receives the poppet valve 28. The chamber 42 has an inlet rim 44 that defines a valve seat on which a first end 43 of poppet valve 28 seats a conical valve element 48 which has a conical face 49. When the conical valve element 48 closes the inlet rim 44, hydraulic fluid is applied from the second inlet 16 through a bore 50 in the valve body 12 to a second chamber 52 in which the valve element 54 of the solenoid 26 is positioned.

In the first mode shown in FIGS. 6 and 7, a plurality of radial inlet ports 58 in the valve element 54 receive hydraulic fluid entering the second inlet 16 and pass the fluid through an open end 60 of the valve element so that the fluid flows through a passage 62 and out of the second outlet port 20. The passage 62 combines with the bore 50 to provide a second passageway 64 that connects the second inlet port 16 to the second outlet port 20.

A laterally extending passage 66 connects the passage 62 to the chamber 42 in which the poppet valve 28 is received. Consequently, hydraulic fluid entering the second input port 16 and passing through the solenoid valve 26 is applied to a second end of the poppet valve 28 against an axially facing, radially extending surface 68 inside of a poppet housing 70. The poppet housing 70 is also urged by a spring 72 to close the poppet valve 28 against the valve seat 46.

The poppet housing 70 also includes a front chamber 74 in which is seated the poppet element 48 having the conical surface 49 which seals against the valve seat 46 under the urging of a coil spring 78 seated in cavity 79. The poppet element 48 has a port 80 therein so that input hydraulic fluid from the inlet port 14 applies pressure from chamber 42 to the cavity 79 within the poppet element to urge the conical face 49 of the poppet element against the seat 46 with a force in addition to a force applied by a coil spring 78. Thus when the solenoid 26 is deactivated the poppet valve 28 ensures that all hydraulic fluid flowing into the second inlet port 16 flows through the ports 58 in the solenoid valve 26 and out of the second outlet port 20.

Figure 9:
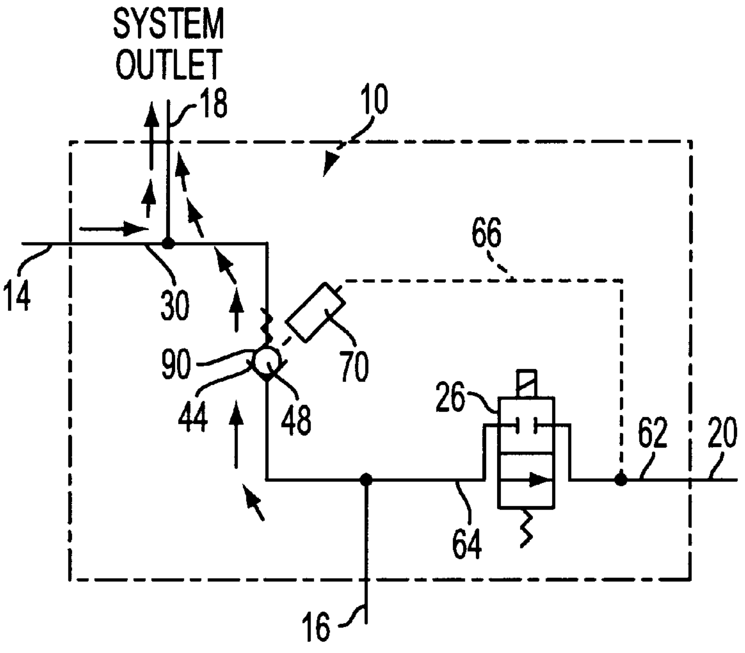
FIG. 9 is a hydraulic circuit diagram schematically illustrating flow through the three-way valve when in the second mode.

When it is desired to shift to the second mode, the solenoid 26 is energized as is shown in FIGS. 8 and 9 thereby closing the plurality of radial ports 58 so that hydraulic fluid does not flow out of the open end 60 of the valve element 54. While the diverter 10 is in the second mode the solenoid 26 is energized so that hydraulic fluid is no longer applied through the passage 66 to the interior of poppet housing 70. Consequently, no force is applied to the surface 68 by hydraulic pressure. Therefore, hydraulic fluid entering the second inlet port 16 is applied against the end of the poppet valve head 48 pushing the poppet element 76 against the housing 70 and compressing the spring 72. This provides axial space between the poppet element 48 and the housing 70 allowing the poppet 48 to axially move against the force of coil spring 78 thereby opening an annular gap 90 between the conical face 49 of the poppet element 48 and the poppet valve seat 46. This allows hydraulic fluid illustrated by the arrows 92 to pass into the passageway 40 and exit through the system outlet 18 so that the system pressure is increased by the addition of the fluid entering the second port 16 to the flow of the system fluid entering the first port 14. By using the check valve 28 to allow diversion of fluid to exit the valve body 12 through the system outlet 18, hydraulic system malfunction due to the reverse Bernoulli effect of the spool tending to close the valve is eliminated because no spool is utilized. When it is desired to return to the first mode of FIGS. 6 and 7, the solenoid 26 is de-energized so that hydraulic fluid entering the second port 16 again flows out of the second port 20 and into the passage 66 to positively urge the poppet valve 28 to close as is seen in FIGS. 6 and 7.

For different applications or even for a different approach with cranes, the solenoid 26 could operate in reverse so that when it is energized there is flow through second outlet port 20 and when it is de-energized there is only flow through the first outlet port or system port 20. While the flow diverted described herein is useful on cranes, other uses where flow diverters are or may be employed are within the TO purview of this disclosure, cranes being exemplary.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A solenoid operated diverter valve comprising:

a valve body having a first inlet, a second inlet, a first outlet and a second outlet;

a first passageway connecting the first inlet and first outlet to the second inlet;

a solenoid valve disposed in a second passageway between the second inlet and the second outlet, the solenoid valve having a first mode in which hydraulic fluid flows through the solenoid valve to the second outlet and a second mode in which the solenoid valve blocks passage from the second inlet to the second outlet; and a check valve disposed between the first passageway and the second passageway, the check valve having a first end urged to close the first passageway to fluid from the second inlet and a second end connected to the second passageway for receiving pressurized hydraulic fluid from the second passageway to keep the check valve closed when the solenoid valve is in the first mode, the first end of the solenoid valve having fluid pressure from the first passageway applied thereagainst to open the second inlet to the first passageway when flow through the second passageway is blocked by the solenoid valve, wherein fluid from the second inlet flows into the first passageway and out of the first outlet rather than through the second outlet.

2. The solenoid operated diverter valve of claim 1, wherein the solenoid valve includes a valve element which closes when the solenoid valve is energized and is open when the solenoid valve is de-energized.

3. The solenoid operated diverter valve of claim 1, wherein the poppet includes a spring arrangement for urging the poppet to close the first passageway to fluid from the second inlet.

4. The solenoid operated diverter valve of claim 3, wherein the poppet valve comprises a poppet element within a poppet housing and wherein the spring arrangement comprises one spring urging the poppet housing to close the first passageway and another spring between the poppet housing and poppet element additionally urging the poppet element to close the first passageway.

5. The solenoid operated diverter valve of claim 1, wherein the first inlet is adapted to be connected to a first pump and the second inlet is adapted to be connected to a second pump.

6. The solenoid diverter valve of claim 5 wherein the valve is adapted for use with a crane, the first pump providing system hydraulic pressure and the second pump providing hydraulic pressure for an outrigger stabilizing system.

* * * * *